US010873365B1

(12) United States Patent
Sedarat

(10) Patent No.: US 10,873,365 B1
(45) Date of Patent: Dec. 22, 2020

(54) ALIEN CROSSTALK CANCELLATION FOR A MULTIPORT ETHERNET SYSTEM

(71) Applicant: Aquantia Corporation, San Jose, CA (US)

(72) Inventor: Hossein Sedarat, San Jose, CA (US)

(73) Assignee: Marvell Asia Pte., LTD., Singapore (SG)

( * ) Notice: Subject to any disclaimer, the term of this patent is extended or adjusted under 35 U.S.C. 154(b) by 0 days.

(21) Appl. No.: 15/669,717

(22) Filed: Aug. 4, 2017

Related U.S. Application Data

(60) Provisional application No. 62/370,824, filed on Aug. 4, 2016.

(51) Int. Cl.
*H04B 3/32* (2006.01)
*H04L 12/931* (2013.01)

(52) U.S. Cl.
CPC .............. *H04B 3/32* (2013.01); *H04L 49/352* (2013.01)

(58) Field of Classification Search
CPC ........................................................ H04B 3/32
USPC ........................................................ 370/201
See application file for complete search history.

(56) References Cited

U.S. PATENT DOCUMENTS

| 6,057,743 | A | 5/2000 | Aekins |
| 6,160,790 | A | 12/2000 | Bremer |
| 6,201,796 | B1 | 3/2001 | Agazzi et al. |
| 6,208,671 | B1 | 3/2001 | Paulos et al. |
| 7,081,763 | B1 | 7/2006 | Zhu |
| 7,177,283 | B2 | 2/2007 | Fukae et al. |
| 7,236,463 | B2 | 6/2007 | Lai |
| 7,346,012 | B2 | 3/2008 | Stopler |
| 7,701,867 | B2 | 4/2010 | Bui |
| 7,720,075 | B2 | 5/2010 | Costo |
| 7,881,322 | B1 | 2/2011 | Benveniste |
| 7,983,289 | B2 | 7/2011 | Yamanaka et al. |
| 8,271,807 | B2 | 9/2012 | Jackson |
| 8,274,894 | B2 | 9/2012 | Knecht et al. |
| 8,335,937 | B2 | 12/2012 | Qi et al. |
| 8,442,099 | B1 * | 5/2013 | Sedarat ................... H04B 3/32 375/219 |
| 8,659,986 | B1 * | 2/2014 | Martinson ............. H04J 3/0697 370/201 |
| 9,742,465 | B1 | 8/2017 | Sedarat |
| 2004/0090927 | A1 * | 5/2004 | Zimmerman ............ H04B 3/32 370/268 |
| 2005/0042931 | A1 | 2/2005 | Lavie |
| 2006/0181283 | A1 | 8/2006 | Wajcer |
| 2006/0182014 | A1 | 8/2006 | Lusky |
| 2006/0203742 | A1 | 9/2006 | Bui |
| 2007/0064151 | A1 | 3/2007 | Chang et al. |
| 2007/0248024 | A1 | 10/2007 | Conway et al. |
| 2010/0135374 | A1 | 6/2010 | Kozek |

(Continued)

FOREIGN PATENT DOCUMENTS

WO      WO 2011/056970 A2      5/2011

*Primary Examiner* — Kodzovi Acolatse
*Assistant Examiner* — Abdeltif Ajid

(57) ABSTRACT

A transceiver system is disclosed. The transceiver system comprises a first transceiver physical layer circuit (PHY) having a first plurality of channels and a second transceiver PHY disposed adjacent the first transceiver PHY and having a second plurality of channels. Far end crosstalk filter circuitry is coupled between at least one of the plurality of first channels and at least one of the plurality of second channels.

13 Claims, 7 Drawing Sheets

(56) References Cited

U.S. PATENT DOCUMENTS

| | | |
|---|---|---|
| 2010/0156437 A1 | 6/2010 | Cobb |
| 2011/0286391 A1 | 11/2011 | Chen et al. |
| 2011/0292977 A1 | 12/2011 | Farjadrad |
| 2011/0317564 A1 | 12/2011 | Saibi |
| 2012/0051240 A1 | 3/2012 | Dwivedi et al. |
| 2012/0195227 A1 | 8/2012 | Vedantham et al. |
| 2013/0242760 A1 | 9/2013 | Peyton |
| 2017/0289045 A1* | 10/2017 | Renner ................ H04L 47/125 |

* cited by examiner

ALIEN CROSSTALK CANCELLATION FOR A MULTIPORT ETHERNET SYSTEM

RELATED APPLICATION(S)

This application claims benefit of priority to Provisional U.S. Patent Application No. 62/370,824, titled "Alien Crosstalk Cancellation For A Multiport Ethernet System", filed Aug. 4, 2016, the aforementioned priority application being hereby incorporated by reference in its entirety.

TECHNICAL FIELD

The disclosure herein relates to electronic communications, and more particularly to mitigating interference in signals transmitted over communication channels.

BACKGROUND

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet, including several different standards for different network bandwidths, including 10GBASE-T allowing 10 gigabit/second connections over unshielded or shielded twisted pair cables.

There are multiple sources of impairment and interference in a 10GBASE-T system which can cause significant performance degradation. These sources of impairment and interference can be broadly categorized as internal and external sources. The internal sources are often caused by the link-partners themselves and imperfect channel characteristics. Examples of these sources are inter-symbol interference (ISI), echo and pair-to-pair cross-talk such as far-end crosstalk (FEXT) and near-end crosstalk (NEXT). Such noise sources are typically known to the link partners and thus can often be cancelled effectively with cancellers and equalizers.

Another type of impairment in 10GBASE-T systems is interference from sources external to a particular link. Examples of external interfering sources, referred to herein as alien interferers, include adjacent cross-talking Ethernet ports/links, where the noise source is from a different port or cable that is adjacent to the subject link (port). In such circumstances, the source of the interference is unknown to the subject link, and is a greater challenge to reduce than noise originating from a known source such as ISI, echo, FEXT, and NEXT.

Accordingly, what is needed are systems and methods that reduce or cancel alien interference in channels of communication systems, providing more robust communication in such systems.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of a transceiver system are disclosed. The transceiver system comprises a first transceiver physical layer circuit (PHY) having a first plurality of channels and a second transceiver PHY disposed adjacent the first transceiver PHY and having a second plurality of channels. Filter circuitry is coupled between at least one of the plurality of first channels and at least one of the plurality of second channels. The filter circuitry enables the first and second PHYs to share information in a manner that allows for a cancellation of far end crosstalk occurring between the PHYs.

Figure 1:
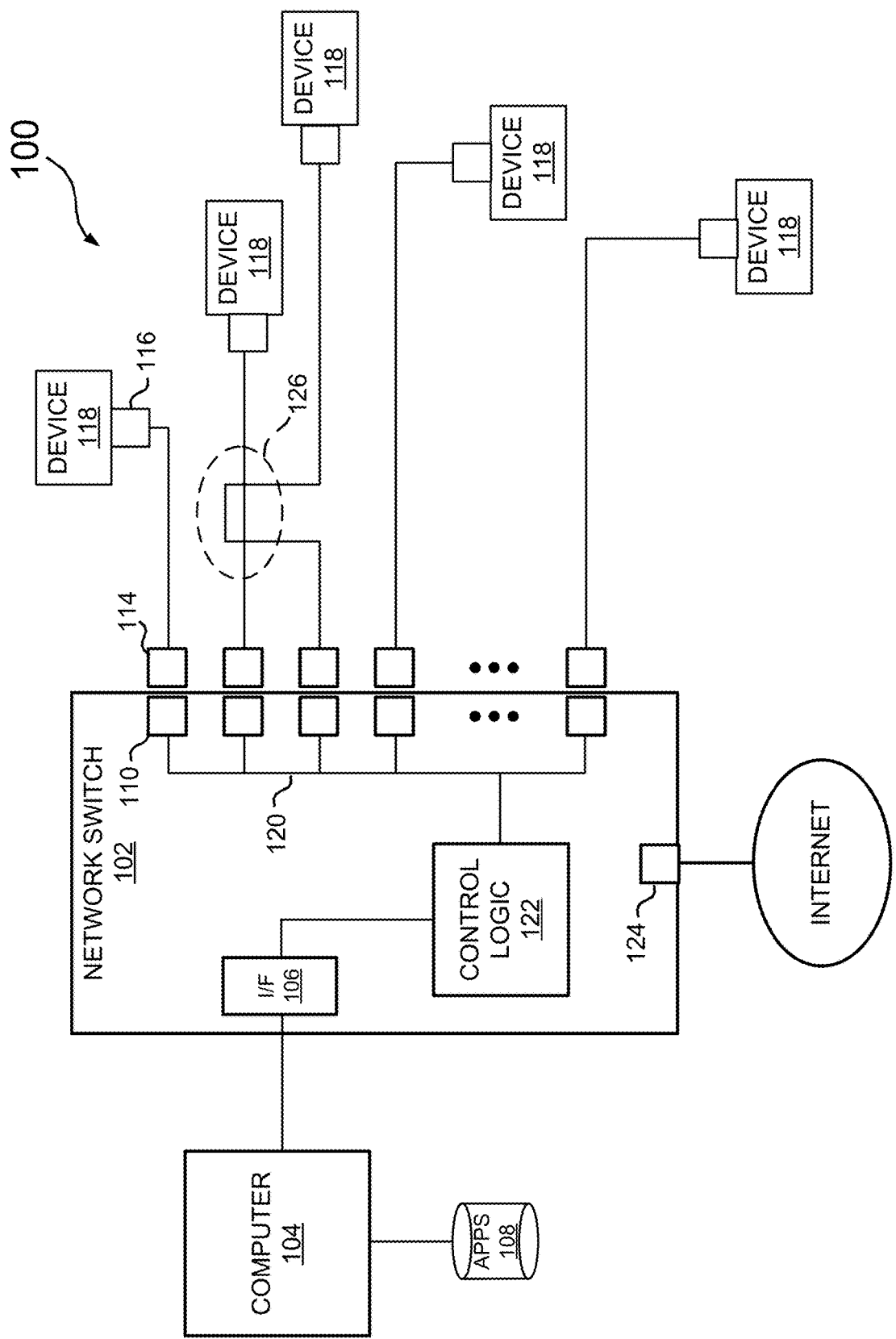
FIG. 1 illustrates one embodiment of an Ethernet network architecture.

FIG. 1 illustrates one embodiment of an Ethernet network architecture, generally designated 100. A network switch 102 interfaces with a computer 104 via an interface circuit 106. The computer may be local to the network, or remote, such that the network switch may be controlled via Information Technology (IT) personnel. The computer executes instructions associated with network applications, including diagnostics software, that are stored in memory 108. The diagnostics software provides a methodology for the switch to carry out diagnostic processes involving, for example, crosstalk cancellation, more fully described below.

Further referring to FIG. 1, the network switch 102 includes multiple Ethernet ports 110 corresponding to individual Ethernet links. The network switch may include, for example, forty-eight ports to support an equal number of links. Each port connects to a local end 112 of an Ethernet cable 114. The remote end 116 of each cable connects to a network device 118, such as a computer, network printer, access node, or the like. Further details regarding each Ethernet link are described below with respect to FIG. 2.

With continued reference to FIG. 1, for one embodiment, each Ethernet port 110 on the network switch 102 communicates to every other port via a signal bus 120. Control logic 122 on the network switch couples to the signal bus 120, and manages coordination between the circuits associated with each port. The network switch may also include an Internet port 124 that provides Internet access to the various Ethernet links.

Figure 2:
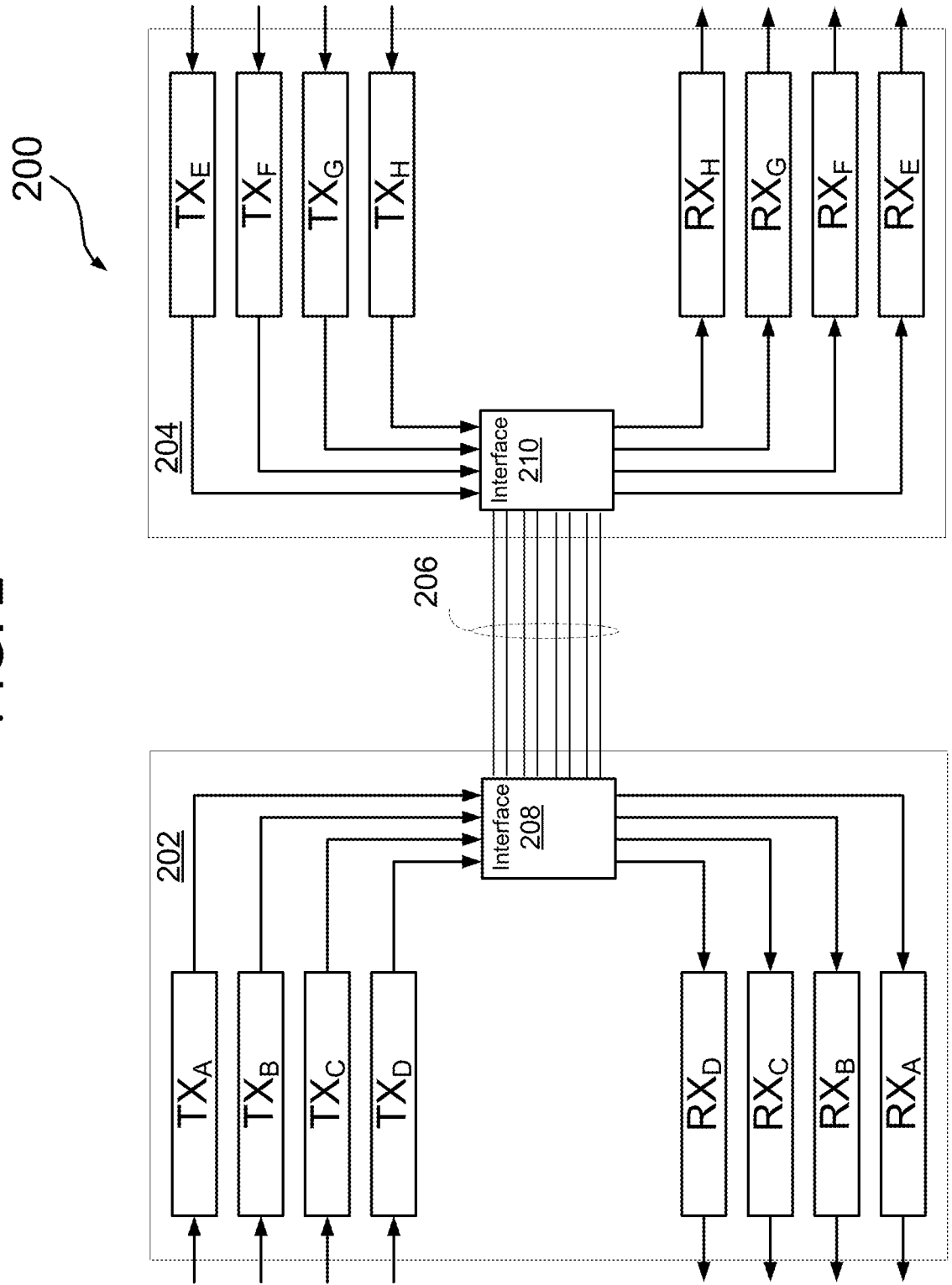
FIG. 2 illustrates one embodiment of an Ethernet link that may be used in the network architecture of FIG. 1.

FIG. 2 is a block diagram illustrating one embodiment of an Ethernet link that may be employed in the network of FIG. 1. The link includes a first transceiver integrated circuit (IC) or chip 202 and a second transceiver chip 204 that can communicate with each other. The first transceiver 202 includes "transceiver components" including one or more transmitters $TX_A$-$TX_D$ and one or more receivers $RX_A$-$RX_D$. Similarly, the second transceiver 204 includes various transceiver components including one or more transmitters $TX_E$-$TX_H$ and one or more receivers $RX_E$-$RX_H$. The transmitters $TX_A$-$TX_H$ shown in FIG. 2 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" (such as the network switch of FIG. 1) associated with each respective transceiver which wants to communicate data over the communication network. For example, the transmitters receive data and control signals from the controller connected to the first transceiver 202 in order to send the data over the network to other transceivers and controllers, while the receivers receive data from other transceivers and controllers via the network in order to provide the data to the controller connected to the first transceiver 202.

The first transceiver chip 202 can communicate with the second transceiver chip 204 over one or more communication channels of a communication link 206. In one embodiment, such as one similar to the 10GBASE-T Ethernet standard, four communication channels are provided on the communication link 206, each channel including a twisted pair cable. Thus, in that standard, there are four transmitters TX and four corresponding receivers RX provided in each of the transceivers 202 and 204, each transmitter associated with one of the local near-end receivers in the same transceiver, and each such transmitter/receiver pair dedicated to one channel used for duplex communication. A transmitter/receiver pair in the first transceiver 202 communicates across a channel of the link 206 to a far-end transmitter/receiver pair in the second transceiver 204. A transmitter TX and a receiver RX that are connected to the same channel/link, or two transceivers connected by the communication link 206, are considered "link partners."

An interface 208 can be provided in the first transceiver chip 202 and an interface 210 can be provided in the second transceiver chip 204 to allow data transmissions between the transceivers to be routed to the appropriate transceiver blocks. For example, the interfaces 208 and 210 can include transformers, and circuitry used for directing signals or data (alternatively, some or all circuitry can be included in other components, such as transmitters TX and receivers RX).

In one example, from the point of view of the first transceiver chip 202, data transmissions during a normal or regular operation mode from a local transmitter TX are provided to the interface 208, which outputs the data on a corresponding channel of the communication link 206. The data is received by the link partner, the second transceiver chip 204. The interface 210 of the transceiver 204 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 2 utilize thousands of such deployments, resulting in complex crosstalk environments. For instance, in many circumstances such as the network of FIG. 1, a commercial building or residence employs existing Ethernet cable throughout various walls and ceilings in order to establish each link from a given remote location in the building (such as a switch plate in a given office), to the centralized location of the network switch. The original routing of the cables may be such that one or more cables cause alien crosstalk interference affecting one or more other cables. This is shown in FIG. 1, at 126.

The Ethernet links of FIG. 2, which are employed in the network of FIG. 1 operate at very high data rates, as high as 10 Gbps. Links that are exposed to alien crosstalk may not be able to operate at such high data rates, and may need to have their data rates reduced in order to have an acceptable signal-to-noise ratio (SNR) for data transfers.

Figure 3:
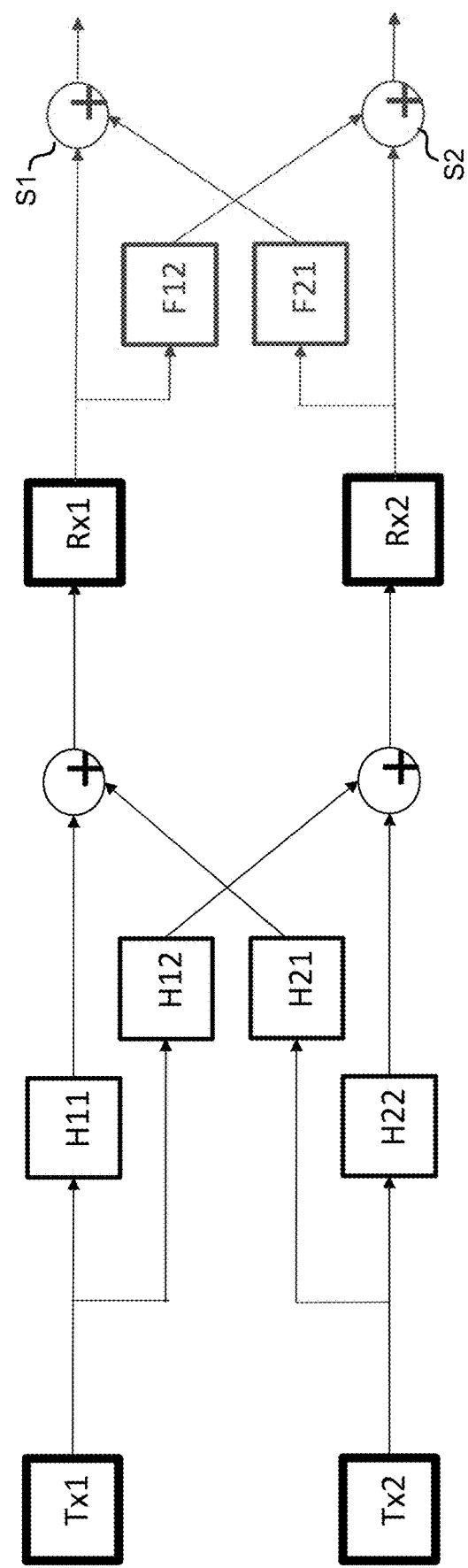
FIG. 3 illustrates one embodiment of a receive-side adaptive cancelling circuit.

FIG. 3 is a schematic diagram illustrating one embodiment of a receive-side adaptive canceling circuit 300 for canceling alien far end crosstalk (FEXT) interference resulting from adjacent Ethernet channels. Herein, the term "cancel" for alien interference is intended to include cancellation of at least part of the total alien interference present, i.e. reduction of the total alien interference, or can include complete cancellation of all substantial alien interference. A first link L1 is defined by the signal path between a first transmitter Tx1 and a first receiver Rx1. A second link L2 is likewise defined by a second transmitter Tx2 and a second receiver Rx2. The amount of far end crosstalk in the two-port system may be characterized by recognizing a transfer function for an insertion loss channel H11 associated with the first link L1, and a second insertion loss channel H22 associated with the second link L2. The characterization also includes a transfer function for a first alien far end crosstalk (AFEXT) channel H12 between the first transmitter Tx1 and the second receiver Rx2, and a second AFEXT channel H21 between the second transmitter Tx2 and the first receiver Rx1.

The adaptive receive-side AFEXT canceling circuit 300 includes a first AFEXT canceller F12 disposed between the first receiver Rx1 and a summing circuit S2 that also receives the output from the second receiver Rx2. A second AFEXT canceller F21 is coupled between the second receiver Rx2 and a second summing circuit S1 that also receives the output from the first receiver Rx1. The inventor has determined that the respective AFEXT cancellers can be represented by values that correspond to ratios between a channels' characterized insertion loss and its contribution (as an aggressor) to far end crosstalk to an adjacent link. Thus, a value for F12 may be approximated by the ratio of −H12/H11, and F21 may be approximated by −H21/H22.

Further referring to FIG. 3, the receiver side AFEXT cancellation circuitry provides for cancellation of AFEXT at a receive side of the links, such as when a network device receives signals via multiple ports from separate remote server links. Having the receiver ports in a common network device enables each port to share crosstalk information to adequately configure the adaptive filters used to carry out the AFEXT cancellation.

Figure 4:
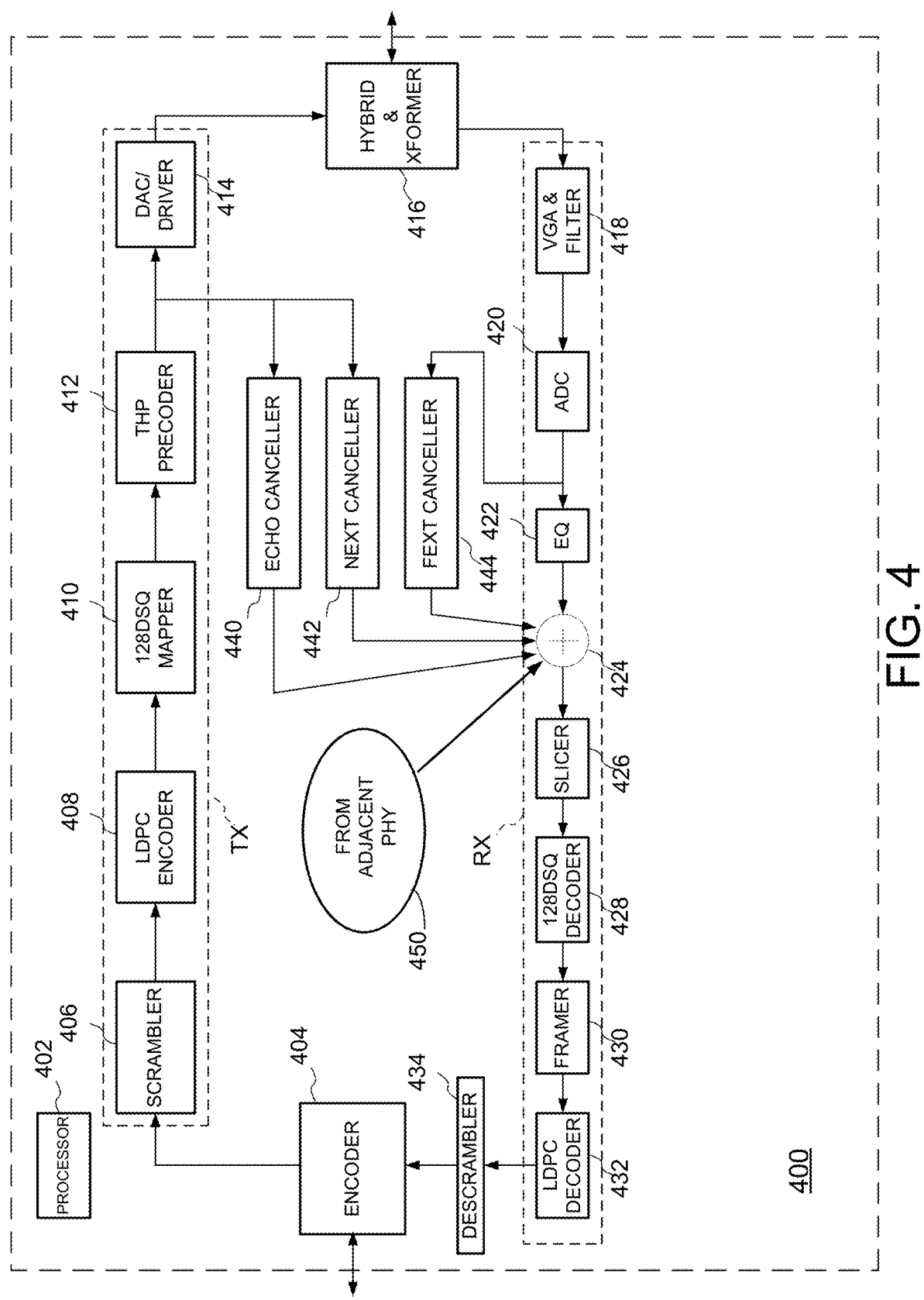
FIG. 4 illustrates one embodiment of a transceiver circuit employing a filter input for receiving information from an adjacent PHY.

FIG. 4 is a block diagram illustrating one example of a transceiver channel, generally designated 400, suitable for use with an embodiment. This example is suitable for NBASE-T and/or 10GBASE-T Ethernet standards, but other different configurations and types of transceiver components can be used in other embodiments for other, different communication standards. For explanatory purposes, the example shown in FIG. 4 illustrates a single transmitter path TX per channel and a single receiver path RX per channel for data. Multiple such paths or channels are provided in embodiments having multiple channels, e.g. four of the transmitter paths and the receiver data paths shown in FIG. 4 are used in the 10GBASE-T standard, one path for each channel.

One or more processors 402 are typically included in transceiver 400, or connected to the transceiver to control various operations for transceiver components described below. In the transmitter path TX, an encoder 404 can be used to encode data desired to be transmitted in a particular desired format or standard, followed by a scrambler 406 for self-synchronized scrambling of the data to be transmitted, providing clock transitions, a statistically random power spectrum for EMI (electromagnetic interference) control, equalizer convergence, etc. A low density parity check (LDPC) encoder 408 encodes the data according to the parity check for error correction. A 128DSQ mapper 410 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 412 can then adjust the signal to assist the far-end receiver in performing signal equalization. An analog front end (AFE) for the transmitter can include a digital-to-analog converter (DAC) and driver block 414 which converts the data to analog form for transmission and transmits the data via the hybrid coupler and transformer block 416 to the channel output port.

In a receiver portion of the transceiver 400, data is received at the hybrid coupler and transformer block 416. Four data communication channels are used in a 10GBASE-T embodiment (other amounts of channels can be used in other embodiments), and are sent to an analog front end (AFE) for the receiver which can include a variable gain amplifier (VGA) and filter 418 for filtering, and an analog-to-digital converter (A/D) 420. An equalizer block 422 can include one or more equalizers to remove inter-symbol interference (ISI). The output of the equalizer block 422 is summed with the outputs of a plurality of filters 440, 442 and 444 (described below) at adder 424, and the output of the adder can be provided to a slicer 426 which can provide an average noise level in the received signal. The signal can then be provided to a DSQ128 decoder 428, which outputs decoded data to a framer 430 that extracts frames from the received data and provides the frames to an LDPC decoder 432 which error-corrects the data. The data can then be provided to a descrambler 434 which outputs de-scrambled data to the encoder 404 for provision to a connected computer system, processor, or other device.

The filters 440, 442 and 444 are used to reduce echo and crosstalk (NEXT and FEXT) noise which may be introduced in the transmission and reception of data over one or more of the four communication channels. The filters cancel out the effect of signal echo and crosstalk from adjacent lines to achieve an acceptable bit error rate. The output of the THP precoder 412 in the transmitter portion TX is provided to the Echo canceller 440 and the NEXT canceller 442, which calculate the values for cancellation of echo and NEXT and output these values to the adder 424. Similarly, the output of ADC 420 is provided to the FEXT canceller 444, which calculates the values for cancellation of FEXT and outputs the values to the adder 424. The digital values of echo and crosstalk calculated by the filter are subtracted from the incoming noisy analog data (digitized by ADC 420) by adder 424 to provide received data on each channel with reduced noise.

The described embodiment may also include an additional filter input at 450, to receive a filtered output (such as from one of H12 or H21 from FIG. 3) associated with the alien far end crosstalk canceller from an adjacent PHY circuit. By including the additional filter input, information between different PHYs may be shared to enable for adaptive filtering and cancellation of crosstalk resulting from the alien far end crosstalk.

While the embodiments described above illustrate examples where alien far end crosstalk may be cancelled at the receive side of a link, in other embodiments, the crosstalk may be pre-cancelled at the transmit side of the link. This is especially useful in circumstances where the transmit side of the links may reside in a common network switch, while the receive sides may reside in separate slave devices, such as separate remote servers.

Figure 5:
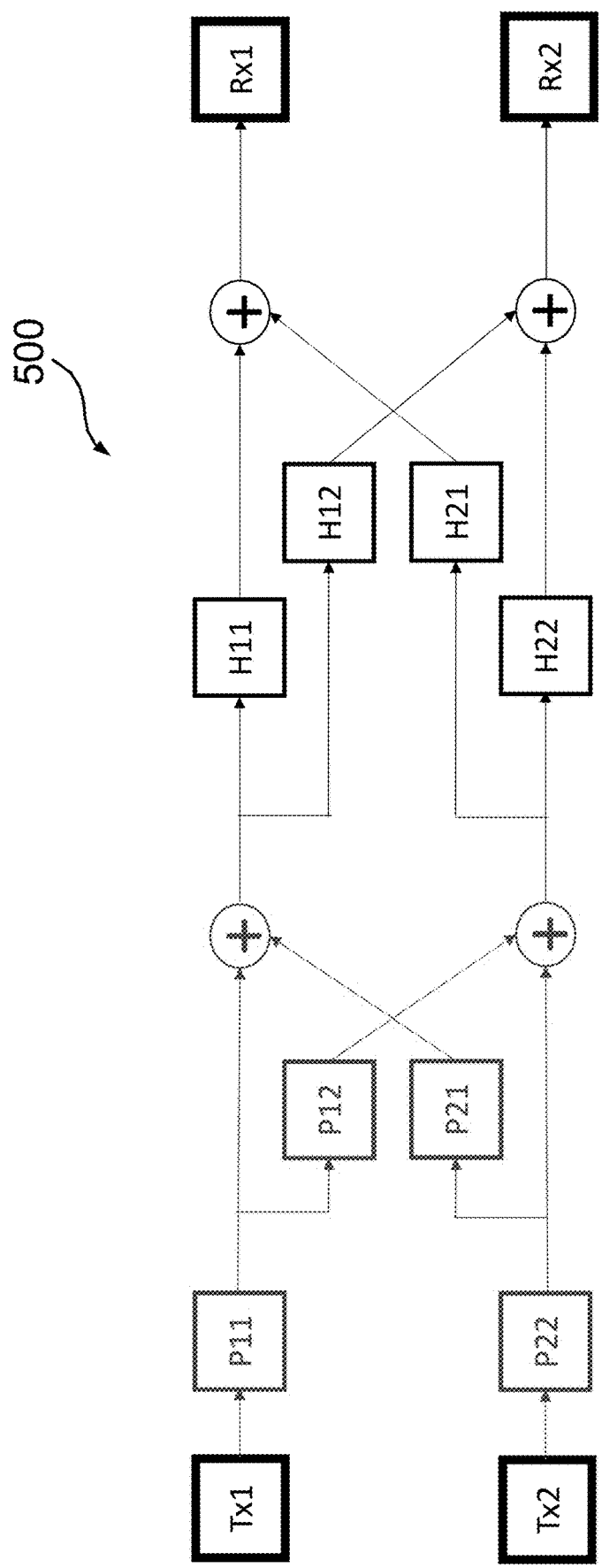
FIG. 5 illustrates a two-port asymmetric system similar to that of FIG. 3, and employing pre-cancellation and alien far-end crosstalk (AFEXT) cancellation circuitry.

FIG. 5 illustrates a two-port system, similar to that of FIG. 3, but including pre-cancellation AFEXT circuitry 500 at the transmit side of multiple links to compensate for the effects of insertion loss channels H11, H22 and AFEXT channels H12, H21. The circuitry includes insertion loss filters P11 and P22, each coupled to the output of a respective transmitter Tx1 and Tx2. The insertion loss filters may be represented by the expression:

$$P_{11} = P_{22} = \left(1 - \frac{H_{12}H_{21}}{H_{11}H_{22}}\right)^{-1}$$

In typical cases where alien crosstalk is much stronger than insertion loss, the value of P11 is equivalent to the value of P22, and approximated by "1." The cancellation circuitry 500 also includes AFEXT filters P12 and P21 that are each coupled between the links on the transmit side of the system. The filters P12 and P21 may be expressed as:

$$P_{12} = -\frac{H_{12}}{H_{22}}, P_{21} = -\frac{H_{21}}{H_{11}}$$

For some embodiments, in operation, during autonegotiation and/or training of the links, receiver circuitry at each end of the links determine the level of crosstalk affecting each link. The receivers send back the detected crosstalk information to the corresponding transmit sides of the link, where the AFEXT pre-cancellation filters may be set up. Sending back the crosstalk information, and/or AFEXT filter coefficients to address the detected crosstalk may be communicated back to the transmit side via any suitable Ethernet training signaling protocol. When employed, for example, in the network switch of FIG. 1, the transmit side pre-cancellation AFEXT circuitry may take advantage of shared crosstalk information between links that are associated with the same network switch.

Figure 6:
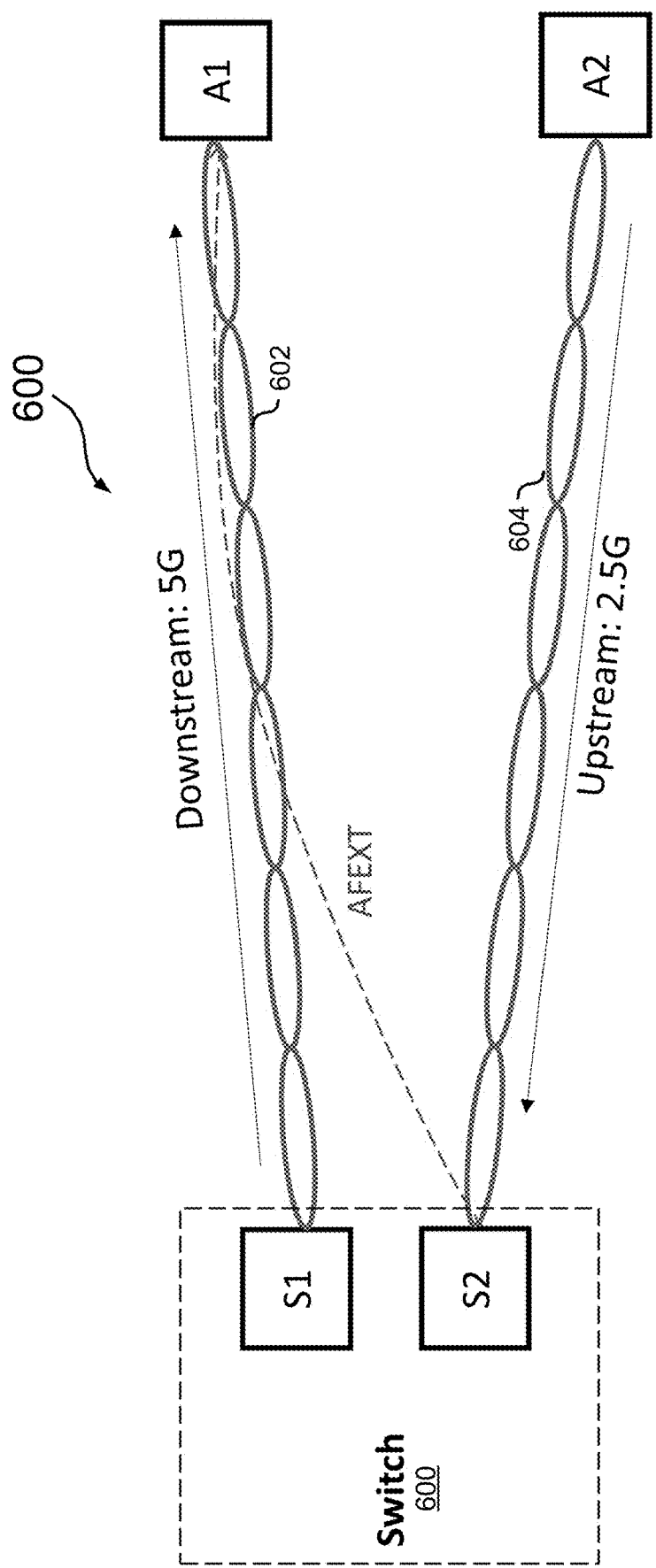
FIG. 6 illustrates a two-port asymmetric Ethernet system.

FIG. 6 illustrates a two-port asymmetric Ethernet system, where there may be asymmetry in the data rate in different directions on the links. A network switch 600 includes first and second Ethernet ports S1 and S2 that interface with access point ports A1 and A2. A first link 602 between switch port S1 and access point port A1 may have a downstream data rate (such as 5 Gbps) that is different than an upstream data rate (such as 2.5 Gbps) available with a second link 604 between switch port S2 and access point port A2.

Generally, data rates at 2.5 Gbps and below are fairly insensitive to alien crosstalk. 10GBASE-T links are typically deployed in data centers over good quality Cat6a cable with little cross-coupling, and are thus immune to crosstalk by design. However, 5GBASE-T deployments in enterprise environments over Cat5e/Cat6 cables are examples of Ethernet technology that may be significantly limited by alien crosstalk. A 5 Gbps receiver is typically sensitive to crosstalk from 5 Gbps aggressor links as opposed to aggressors at other data rates.

With the system of FIG. 6 in mind, and from the perspective of the network switch 600, the downstream transmit link (5 Gbps) provides a relatively wideband signal, and thus is a strong aggressor link. The upstream receive link (2.5 Gbps), on the other hand, is a narrowband receiver, and thus not susceptible to alien crosstalk. From the perspective of the access points A1 and A2, the upstream transmit link of 2.5 Gbps is a narrowband signal, and thus a weak aggressor, while the downstream receive link of 5 Gbps is a wideband receiver, and thus sensitive to alien crosstalk. As a result, the only strong alien crosstalk path is the AFEXT from the network switch transmitter S2 to the access point receiver A1.

With continued reference to FIG. 6, since the alien crosstalk signal is emanating from the network switch 600, the source of the crosstalk is available to all transmit ports on that switch. By knowing the crosstalk channel from each switch transmit port to each access point receive port, the crosstalk noise may be pre-cancelled at the switch transmitter so that the access point receives the signal with little to no crosstalk noise. This involves making the transmit signal of each transmitter port in the switch available to the other transmit ports. In some embodiments, the transmitters in the switch are phase-locked through, for example, a Synchronized Ethernet (SyncE) scheme.

Figure 7:
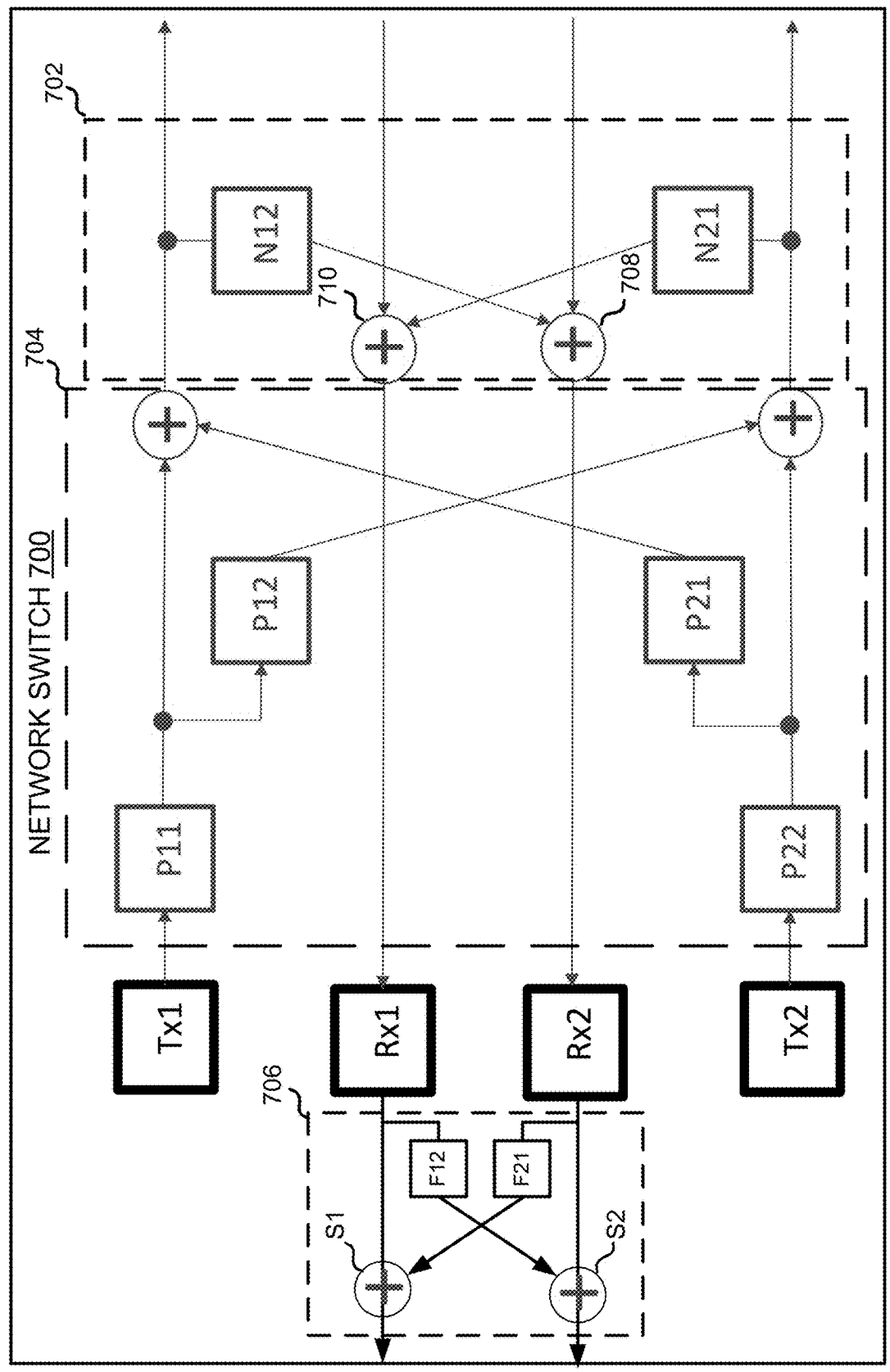
FIG. 7 illustrates an embodiment of a two-port Ethernet system including ANEXT circuitry.

FIG. 7 illustrates an embodiment of a two-port system similar to FIG. 5, such as a network switch 700. The switch 700 includes alien near end crosstalk (ANEXT) cancellation circuitry 702 to complement transmit side AFEXT cancellation circuitry 704 and receive-side AFEXT cancellation circuitry 706. The transmit side AFEXT cancellation circuitry 704 includes insertion loss filters P11 and P22, each coupled to the output of a respective transmitter Tx1 and Tx2. The insertion loss filters may be represented by the expression:

$$P_{11} = P_{22} = \left(1 - \frac{H_{12}H_{21}}{H_{11}H_{22}}\right)^{-1}$$

In typical cases where alien crosstalk is much stronger than insertion loss, the value of P11 is equivalent to the value of P22, and approximated by "1." The cancellation circuitry also includes AFEXT filters P12 and P21 that are each coupled between the links on the transmit side of the system. The filters P12 and P21 may be expressed as:

$$P_{12} = -\frac{H_{12}}{H_{22}}, P_{21} = -\frac{H_{21}}{H_{11}}$$

In some embodiments, the transmitters and receivers of the network switch 700 operate within the same timing domain, or are synchronized in a manner consistent with synchronized Ethernet standards. Although not explicitly shown, the transmitters and receivers are also coupled together in a manner that allows for crosstalk information sharing during, for example, training modes, to establish filter coefficients and other active filter parameters.

Further referring to FIG. 7, the ANEXT cancellation circuitry 702 includes a first ANEXT canceller N12 coupled between the transmit path of the first transmitter Tx1 and the second receiver Rx2 via a summing circuit 708. A second ANEXT canceller couples the second transmitter Tx2 to receiver Rx1 via summing circuit 710. The ANEXT cancellation circuitry provides active filter compensation to address ANEXT crosstalk emanating between transmit and receive paths of different ports.

With continued reference to FIG. 7, the receive side AFEXT cancellation circuitry 706 includes a first AFEXT canceller F12 disposed between the first receiver Rx1 and a summing circuit S2 that also receives the output from the second receiver Rx2. A second AFEXT canceller F21 is coupled between the second receiver Rx2 and a second summing circuit S1 that also receives the output from the first receiver Rx1. The value for F12 may be approximated by the ratio of $-H_{12}/H_{11}$, and F21 may be approximated by $-H_{21}/H_{22}$. The receive side AFEXT cancellation circuitry provides active filter compensation, at a receiver end of two interfering links, to address AFEXT crosstalk emanating between transmit paths of the links. Note that with this architecture, alien NEXT and alien FEXT are cancelled in network switch ports. Alien FEXT is also pre-cancelled for ports in the access point. The only remaining component is alien NEXT in the access point. This component, however, may not be strong if the ports in the access points are physically disposed at a relatively long distance, or, in the scenario where traffic and data signaling is asymmetric. While the crosstalk cancelling filters (e.g. Fij and Pij) are expressed in this document in approximate form based on channel response (Hij), these filters may be derived through one of the many variants of well-known algorithms, such as minimum mean-square error (MMSE) or adaptively through least mean-square (LMS), or recursive least squares (RLS).

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An Ethernet circuit comprising:
a first Ethernet port including a first transceiver physical layer circuit (PHY) having a first plurality of channels to transceive first data via a first Ethernet link, the first plurality of channels including respective first transmitters in the first Ethernet port;
a second Ethernet port different from the first Ethernet port and including a second transceiver PHY having a second plurality of channels to transceive second data independent of the first data via a second Ethernet link that is independent of the first Ethernet link, the second plurality of channels including respective second transmitters in the second Ethernet port, wherein at least one of the second plurality of channels is electromagnetically coupled to at least one of the first plurality of channels to establish an alien far-end crosstalk (AFEXT) path, the AFEXT path exposing the first plurality of channels to AFEXT noise that is external to the first plurality of channels; and
pre-cancellation AFEXT filter circuitry coupled between at least one first transmitter input of the first Ethernet port and at least one second transmitter input of the second Ethernet port, the AFEXT filter circuitry configured to cancel the AFEXT noise at the first and second transmitters of the first and second Ethernet ports.

2. The Ethernet circuit of claim 1, wherein:
the first Ethernet port transceives data at a rate different than the second Ethernet port.

3. The Ethernet circuit of claim 1, wherein:
the first port and the second port are synchronized to a common clock.

4. The Ethernet circuit of claim 1, wherein:
the first port and the second port are disposed in a common Ethernet network device.

5. The Ethernet circuit of claim 1, wherein:
the first transceiver PHY and the second transceiver PHY are disposed in a common chip package.

6. The Ethernet circuit of claim 1, further comprising:
backchannel circuitry coupled to respective link partner receiver circuits;
wherein the first and the second transmitters receive AFEXT crosstalk information from the respective link partner receiver circuits via the backchannel circuitry.

7. An Ethernet device comprising:
a first Ethernet port including first transmit circuitry and first receiver circuitry, the first Ethernet port for transceiving first data via a first Ethernet link;
a second Ethernet port different from the first Ethernet port and including second transmit circuitry and second receiver circuitry, the second Ethernet port for transceiving second data independent of the first data via a second Ethernet link that is independent of the first Ethernet link;
transmit side alien far end crosstalk (AFEXT) cancellation circuitry coupled between the first transmit circuitry of the first Ethernet port and the second transmit circuitry of the second Ethernet port, the AFEXT cancellation circuitry to cancel AFEXT noise at the first and second transmit circuitry of the first and second Ethernet ports, the AFEXT noise comprising interference that is external to at least one of the first and second Ethernet links; and
alien near end crosstalk (ANEXT) cancellation circuitry including a first ANEXT filter coupled between the first transmit circuitry and the second receiver circuitry, and a second ANEXT filter coupled between the second transmit circuitry and the first receiver circuitry.

8. The Ethernet device of claim 7, further comprising:
receive side alien far end crosstalk (AFEXT) cancellation circuitry coupled between the first receiver circuitry and the second receiver circuitry.

9. The Ethernet device of claim 7, wherein:
the first Ethernet port transceives data at an upstream data rate, and the second Ethernet port transceives data at a downstream data rate that is different than the upstream data rate.

10. The Ethernet device of claim 7, embodied as an Ethernet network switch.

11. An Ethernet transceiver integrated circuit (IC) chip, comprising:
a first Ethernet port including a first transceiver physical layer circuit (PHY) having a first plurality of channels, the first plurality of channels including respective first transmitters in the first Ethernet port to transmit first data along a first Ethernet link;
a second Ethernet port different from the first Ethernet port and including a second transceiver PHY having a second plurality of channels, the second plurality of channels including respective second transmitters in the second Ethernet port to transmit second data that is independent of the first data along a second Ethernet link that is independent of the first Ethernet link, wherein at least one of the second plurality of channels electromagnetically couples to at least one of the first plurality of channels to establish an alien far-end crosstalk (AFEXT) path, the AFEXT path exposing the first plurality of channels to AFEXT noise that is external to the first plurality of channels; and AFEXT filter circuitry coupled between at least one first transmitter input of the first Ethernet port and at least one second transmitter input of the second Ethernet port, the AFEXT filter circuitry to cancel the AFEXT noise at the first and second transmit circuitry of the first and second Ethernet ports.

12. The Ethernet transceiver IC chip of claim 11, wherein: the first port and the second port are synchronized to a common clock.

13. The Ethernet transceiver IC chip of claim 11, wherein: the first Ethernet port transceives data at an upstream data rate, and the second Ethernet port transceives data at a downstream data rate that is different than the upstream data rate.

\* \* \* \* \*